United States Patent
Doerr et al.

(10) Patent No.: US 7,425,043 B2
(45) Date of Patent: Sep. 16, 2008

(54) METHOD AND DEVICE FOR TRIGGERING AN AUTOMATIC EMERGENCY BRAKING PROCESS OF A VEHICLE

(75) Inventors: Heiko Doerr, Berlin (DE); Matthias Gut, Reutlingen (DE); Wolfram Mendt, Goslar (DE); Lorenz Schaefers, Weilheim (DE); Ingo Scherhaufer, Berglen (DE); Juergen Trost, Grafenberg (DE); Gert Volk, Stuttgart (DE); Ursula Voss, Stuttgart (DE)

(73) Assignee: Daimler AG, Stuttgart (DE)

( * ) Notice: Subject to any disclaimer, the term of this patent is extended or adjusted under 35 U.S.C. 154(b) by 241 days.

(21) Appl. No.: 10/527,982

(22) PCT Filed: Aug. 30, 2003

(86) PCT No.: PCT/EP03/09643

§ 371 (c)(1), (2), (4) Date: Sep. 30, 2005

(87) PCT Pub. No.: WO2004/028847

PCT Pub. Date: Apr. 8, 2004

(65) Prior Publication Data

US 2006/0097570 A1    May 11, 2006

(30) Foreign Application Priority Data

Sep. 20, 2002  (DE) .................. 102 43 978
Dec. 16, 2002  (DE) .................. 102 58 617

(51) Int. Cl.
    *B60T 8/32*    (2006.01)
    *B60T 7/12*    (2006.01)
(52) U.S. Cl. .................. 303/193; 701/96; 701/301
(58) Field of Classification Search .................. 303/191, 303/193; 701/96, 300, 301; 180/167, 169; 340/435, 436, 438, 901, 902, 903, 904
See application file for complete search history.

(56) References Cited

U.S. PATENT DOCUMENTS

| 4,048,613 | A | | 9/1977 | Ito et al. |
| 4,941,365 | A | | 7/1990 | Rainer |
| 5,278,764 | A | | 1/1994 | Iizuka et al. |
| 5,410,484 | A | | 4/1995 | Kunimi et al. |
| 5,529,138 | A | | 6/1996 | Shaw et al. |
| 6,021,375 | A | * | 2/2000 | Urai et al. .................. 701/301 |
| 6,238,021 | B1 | | 5/2001 | Sugimoto |
| 6,292,753 | B1 | * | 9/2001 | Sugimoto et al. ........... 701/301 |

(Continued)

FOREIGN PATENT DOCUMENTS

DE    38 43 818 C1    12/1988

(Continued)

*Primary Examiner*—Thomas J Williams
(74) *Attorney, Agent, or Firm*—Crowell & Moring LLP

(57) ABSTRACT

A method and apparatus for triggering automatic emergency braking in a vehicle, such as a truck, provides an assistance function for avoiding or mitigating the effects of a rear end collision with a vehicle traveling ahead. A driver warning is triggered if a predefined warning condition requires that an automatic emergency braking process is triggered, but only after the expiration of a predefined warning time period, in order to avoid the vehicle having a rear end collision with the vehicle traveling ahead.

22 Claims, 3 Drawing Sheets

U.S. PATENT DOCUMENTS

| | | |
|---|---|---|
| 6,294,987 B1 | 9/2001 | Matsuda et al. |
| 6,473,681 B1 * | 10/2002 | Eckert et al. ................... 701/96 |
| 2004/0122578 A1 * | 6/2004 | Isaji et al. ................... 701/301 |

FOREIGN PATENT DOCUMENTS

| | | |
|---|---|---|
| DE | 41 01 759 A1 | 1/1991 |
| DE | 199 21 238 A1 | 11/1999 |
| EP | 0 976 627 A1 | 2/2000 |
| EP | 1 349 131 A1 | 10/2003 |
| JP | 06 338000 | 6/1994 |
| WO | WO 02/43029 A1 | 5/2002 |

* cited by examiner

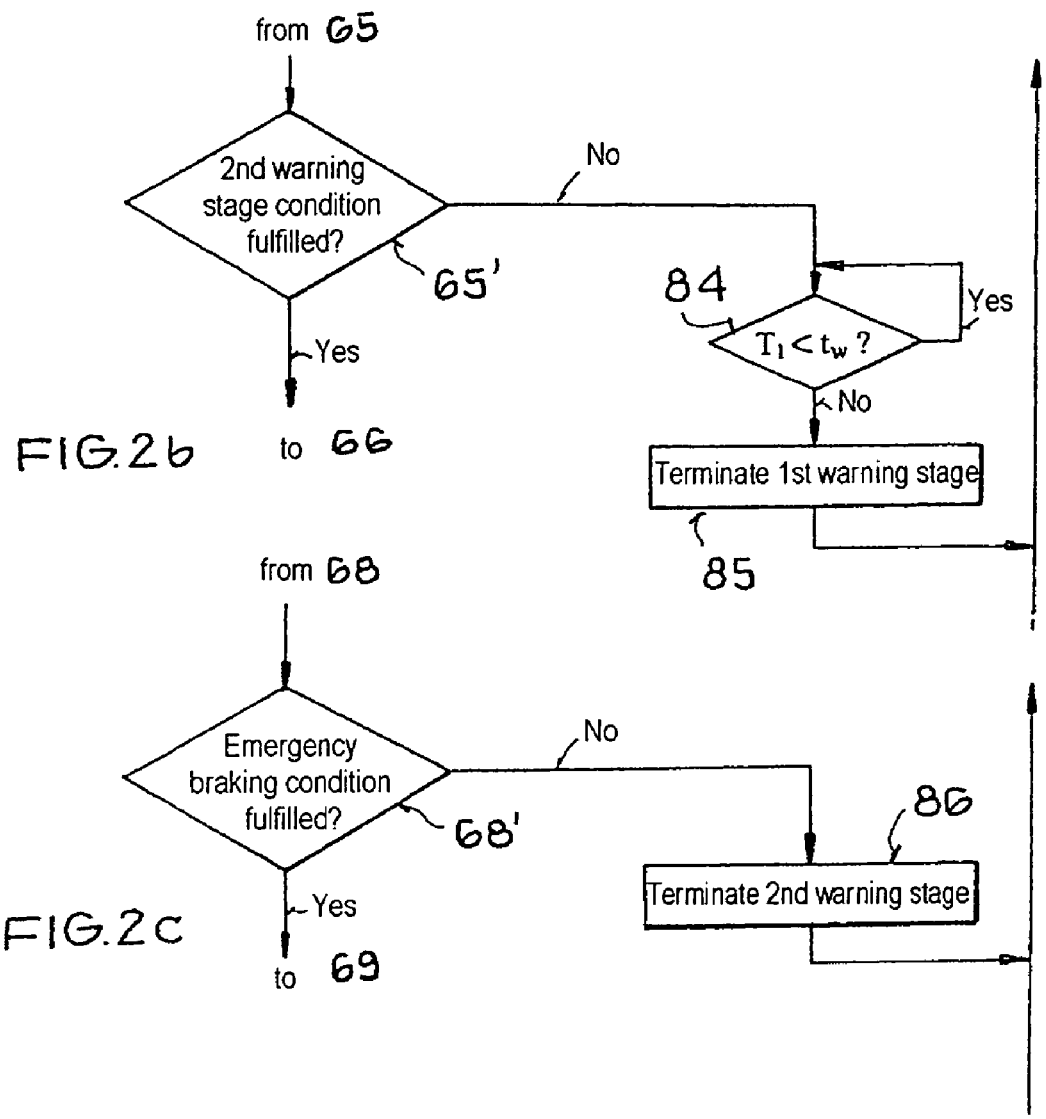
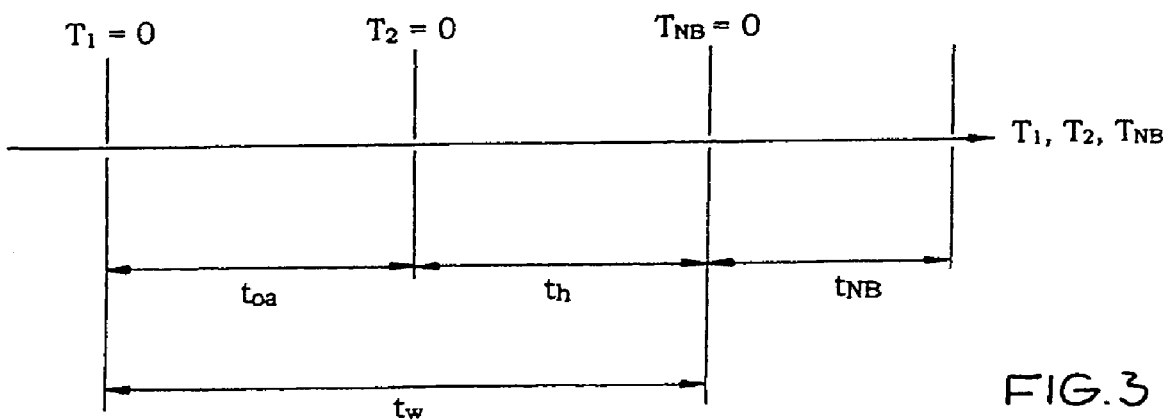

METHOD AND DEVICE FOR TRIGGERING AN AUTOMATIC EMERGENCY BRAKING PROCESS OF A VEHICLE

BACKGROUND AND SUMMARY OF THE INVENTION

This application claims the priority of German patent documents 102 43 978.8, filed Sep. 20, 2002 and 102 58 617.9, filed Dec. 16, 2002 (PCT International Application No. PCT/EP2003/009643), the disclosures of which are expressly incorporated by reference herein.

The invention relates to a method and apparatus for triggering automatic emergency braking in a vehicle, such as a truck.

In particular, the invention provides an assistance function for avoiding a rear end collision of a vehicle with a vehicle traveling ahead, and/or for reducing the consequences of the accident if a rear end collision is unavoidable. For this purpose, a driver warning is triggered if a given warning condition is fulfilled, and automatic emergency braking is triggered upon the expiration of a predefined warning time period.

German patent document DE 41 01 759 A1 discloses an automatic brake system for a vehicle, includes a speed sensor for detecting the speed of a vehicle and a distance sensor for detecting the distance between the vehicle and the vehicle traveling in front. The brake system determines a limiting time based on the relative speed and the distance from the vehicle traveling in front. (The limiting time is the time taken for the vehicle to impact the vehicle traveling in front.) An alarm signal is issued to the driver of the vehicle if the limiting time is shorter than a predefined limiting time threshold value when the brake pedal has not been depressed. If the driver of the vehicle does not depress the brake pedal in response to the alarm signal, automatic braking is carried out following the expiration of a predefined (permanent or variable) time interval, in order to reduce the speed of the vehicle, with the aim of avoiding an impact with the vehicle traveling in front, until the limiting time is again longer than the predefined limiting time threshold value.

Due to the way in which the predefined limiting time threshold value is set by the brake system, it is possible for it to be too short to be able to avoid an impact with the vehicle traveling in front by carrying out the automatic braking process. In this case, it is not sufficient to consider only the limiting time (up to the impact), and the brake system additionally determines a stopping distance, which is necessary to stop the vehicle, on the basis of the speed of the vehicle and the coefficient of friction between the surface of the road and the vehicle's tires. If the limiting time is longer than the predefined limiting time threshold value but the distance between the vehicle and vehicle traveling in front is shorter than the determined stopping distance, the automatic braking process of the vehicle is also carried out after the alarm signal has been issued, until the distance is once more longer than the currently determined stopping distance.

In determining both the limiting time and the stopping distance, it is disadvantageous that the driving situation and traffic situation are considered in a simplified way. For this reason, in complex traffic situations a risk of an impact with the vehicle traveling in front may, under certain circumstances, not be detected or be estimated incorrectly so that the issuance of the alarm signal (and hence, if appropriate, the execution of the automatic braking process) takes place too early, too late, not at all, or unnecessarily.

One object of the present invention is therefore to provide a method and apparatus of the type mentioned at the beginning with which the probability of incorrect triggering of the driver alarm, and thus of the automatic emergency braking process, in complex traffic situations is reduced.

This and other objects and advantages are achieved by the method and apparatus according to the invention, in which the driver warning is triggered if a predefined warning condition is fulfilled, based on the instantaneous driving situation of the vehicle and a predefined emergency braking deceleration. In this case, automatic emergency braking process is triggered when a predefined warning time period (for avoiding a rear end collision of the vehicle with the vehicle traveling in front and/or for reducing the consequences of an accident when a rear end collision is unavoidable) expires. The purpose of this process is to attain (after the automatic emergency braking process has finished) a predefined target relative speed and/or a predefined target safety distance between the vehicle and the vehicle traveling in front.

By suitably predefining the target relative speed and/or the target safety distance it is possible, inter alia, to ensure that the triggering of the driver alarm and thus the triggering of the automatic emergency braking process do not take place earlier than is necessary to avoid a rear end collision with the vehicle traveling in front. The instantaneous driving situation becomes apparent here at least from the registered acceleration of the vehicle and the registered relative acceleration between the vehicle and vehicle traveling in front. By including these variables it is possible for the risk of a rear end collision of the vehicle with the vehicle traveling in front to be reliably detected and/or correctly estimated in a large number of complex traffic situations. The use of the method and apparatus according to the invention is particularly appropriate in trucks, since due to the large masses of such vehicles a collision with the vehicle traveling in front generally has serious consequences. The risk of a rear end collision not only with a vehicle traveling in front, but also with any other moveable or fixed obstacle, is detected.

The driver warning advantageously takes place in a way which can be perceived visually, acoustically and/or haptically by the driver of the vehicle. It is therefore possible to make the driver aware in an unambiguous way that there is a risk of colliding with the vehicle traveling in front, and therefore the automatic emergency braking process is triggered when the predefined warning time period expires.

In order to make the automatic emergency braking process more reliable, it is possible for kinetic energy to be drawn from the driver, particularly before the process is triggered, by issuing a driver warning which can be perceived haptically by the driver of the vehicle in the form of a partial braking process of the vehicle with a predefined partial braking deceleration. The predefined partial braking deceleration is smaller here than the predefined emergency braking deceleration.

Furthermore there is the possibility of triggering automatic emergency braking only if a given emergency braking condition is fulfilled and the predefined warning time period has expired. It is thus possible to check the necessity of the automatic emergency braking process once more before it is triggered.

The emergency braking deceleration or a variable which is associated with it, such as the emergency braking pressure, the emergency braking force or the emergency braking torque, can be predefined either in a permanent or else adjustable fashion. In the latter case it is possible, as a function of variables which describe, for example, the mass of the vehicle, the coefficient of friction of the linings of the wheel brake devices of the vehicle, the condition of the roadway or the visibility conditions, to determine, for example, a maximum braking deceleration which can actually be achieved and set the value of the predefined emergency braking deceleration in accordance with the registered maximum braking deceleration which can actually be achieved. The value of the emergency braking deceleration can also easily be predefined in a permanent fashion, in which case an average achievable maximum braking deceleration, whose value is typically in the range between 5 m/s$^2$ and 7 m/s$^2$, is preferably assumed.

The same applies to the predefinition of the warning time period which can also be carried out in a permanent or adjustable fashion. A permanently predefined warning time period has the advantage that the driver is aware of the time when the automatic emergency braking process is triggered, so that the process does not occur in an unexpected or unpredictable way. A suitable value of the predefined warning time period, which may be registered on the basis of driving trials, typically lies in the range between 1.7 and 2.3 seconds.

On the other hand it is conceivable to set the value of the predefined warning time period as a function of variables which describe, for example, the mass of the vehicle, the coefficient of friction of the linings of the wheel brake devices of the vehicle, the condition of the roadway or the visibility conditions. In this context a minimum value of the warning time period is predefined, which value is not to be undershot in order for sufficient time to remain in principle to the driver to prepare himself for triggering of the automatic emergency braking process or even intervene himself beforehand.

The target relative speed can also either be predefined in a permanent fashion or else in an adjustable fashion. It is advantageous here if the value of a permanently predefined target relative speed is approximately zero. In this case, the vehicle's own speed is reduced by the automatic emergency braking process only to the absolutely necessary extent in order to reliably prevent a collision with the vehicle ahead. Any further reduction in the vehicle's own speed is unnecessary and constitutes an additional hazard, particularly for vehicles traveling behind.

In addition, the target safety distance can also be predefined in a permanent or adjustable fashion. The value of the target safety distance can either be set as a function of variables which describe, for example, the mass of the vehicle, the coefficient of friction of the brake linings of the wheel brake devices of the vehicle, the condition of the roadway, the speed of the vehicle or the visibility conditions or else be carried out manually by the driver of the vehicle. A minimum value for the target safety distance is preferably predefined here so that the vehicle is prevented from traveling too close to the vehicle traveling in front after the automatic emergency braking process has finished. For the sake of simplicity, the predefinition of the value of the target safety distance can also be permanently predefined, said value then typically lying between zero and several meters.

When the driver is active and/or when the risk of a rear end collision has been reduced, a driver warning is advantageously not triggered and/or the intensity of the driver warning is advantageously adapted. This avoids a situation in which the driver of the vehicle feels disrupted by unnecessarily triggered driver warnings and permanently switches off the device according to the invention so that the method according to the invention is not carried out.

Furthermore, when the driver is active and/or when the risk of a rear end collision is reduced, a driver warning which has already been triggered can be terminated and/or changed and/or it is possible for the automatic emergency braking process not to be triggered. On the one hand, the driver is given the opportunity, for as long as possible, of taking suitable countermeasures for avoiding the rear end collision with the vehicle traveling in front and, on the other hand, a driver warning which has become unnecessary in the meantime is no longer maintained and/or an automatic emergency braking process which has become unnecessary in the meantime is not triggered at all.

It is possible to trigger the emergency braking process automatically when the predefined warning time period expires if the driver warning is not aborted during the predefined warning time period. In this case, the driver of the vehicle is informed of the time when the automatic braking process will be triggered, and has the opportunity of taking suitable countermeasures in order to avoid the rear end collision with the vehicle traveling in front.

In order to avoid putting the success of an already triggered automatic braking process at risk due to the driver's prematurely aborting the process, the process is not aborted until a registered emergency braking time period has expired and/or the predefined target relative speed and the predefined target safety distance are attained. The emergency braking time period depends on the instantaneous driving situation when the automatic emergency braking process is triggered, the predefined emergency braking deceleration, the target relative speed and the target safety distance.

The driver warning is advantageously composed of at least two warning stages which are triggered in chronological succession within the predefined warning time period of the driver warning, with each warning stage being assigned one predefined warning stage time period. This makes it possible to build up the driver warning by using warning stages of differing levels of urgency, with the possibility of the level of urgency of the warning stages increasing as the time remaining until the automatic emergency braking process is triggered decreases so that the driver is informed of the decreasing time period until the triggering of the automatic emergency braking process.

The warning stage time period may be predefined in a permanent fashion or else in an adjustable fashion. A permanently predefined warning stage time period has the advantage that the driver is aware of the time of the triggering of a possibly following warning state and/or of the automatic emergency braking process and the latter does not occur in an unexpected or unpredictable fashion. In addition there is the possibility of setting the value of the warning stage time period as a function of variables which describe, for example, the mass of the vehicle, the coefficient of friction of the brake linings of the wheel brake devices of the vehicle, the visibility conditions or the condition of the roadway. It is thus possible, for example, to trigger the last, and thus generally most urgent warning stage, earlier as the conditions for avoiding the rear end collision by triggering the automatic emergency braking process become less favorable.

Furthermore there is the possibility, after a first warning stage has been triggered, of triggering at least one further warning stage only if a predefined warning condition which is respectively assigned to the further warning stage is fulfilled. The necessity to trigger any further warning stage can thus be checked and the triggering of unnecessary warning stages which are inappropriate for the actual risk of a rear end collision can be avoided.

When the driver is active and/or when the risk of a rear end collision is reduced, at least one of the warning stages which has already been triggered can be terminated and/or it is possible for further warning stages not to be triggered. This avoids the situation in which the driver of the vehicle feels disrupted by unnecessarily triggered warning stages and deactivates the device according to the invention. It is also possible in this context to maintain a warning stage which has already been triggered, and which is present, for example, in the form of a visual driver warning, until the predefined warning time period expires and merely to refrain from triggering further warning stages in order to inform the driver of the potential risk of a rear end collision.

Activity on the part of the driver is expediently detected on the basis of an activation of at least one of the operator control elements of the vehicle, with the operator control element being used in particular to change the longitudinal dynamics or transverse dynamics of the vehicle. The operator control elements which are suitable for detecting the driver's activity include, for example, the accelerator pedal, the brake pedal, the clutch pedal, the steering wheel or the direction indicators of the vehicle.

A reduction in the risk of a rear end collision can easily be detected by reference to an increasing distance and/or a decreasing relative speed between the vehicle and vehicle traveling in front.

In order to be able to reliably detect or correctly estimate the risk of the vehicle's having a rear end collision with the vehicle traveling in front, even in complex traffic situations, the instantaneous driving situation of the vehicle is determined as a function of the registered distance between the vehicle and vehicle traveling in front and/or the registered speed of the vehicle and/or the registered relative acceleration between the vehicle and vehicle traveling in front and/or the registered acceleration of the vehicle and/or the inclination of the roadway and/or of coefficients of friction between the roadway and the vehicle's wheels.

In order to reduce the risk of possible consequent accidents, when the automatic emergency braking process is triggered, a warning can be issued to vehicles traveling in front and/or vehicles traveling behind. For this purpose, for example the brake lights, the vehicle horn, the hazard warning lights or the headlights or full beam of the vehicle are activated.

Other objects, advantages and novel features of the present invention will become apparent from the following detailed description of the invention when considered in conjunction with the accompanying drawings.

BRIEF DESCRIPTION OF THE DRAWINGS

FIG. 2b is an alternative embodiment of the method according to the invention;

FIG. 2c is a further alternative embodiment of the method according to the invention; and FIG. 3 is an illustration of the time sequence of the method according to the invention.

DETAILED DESCRIPTION OF THE DRAWINGS

Figure 1:
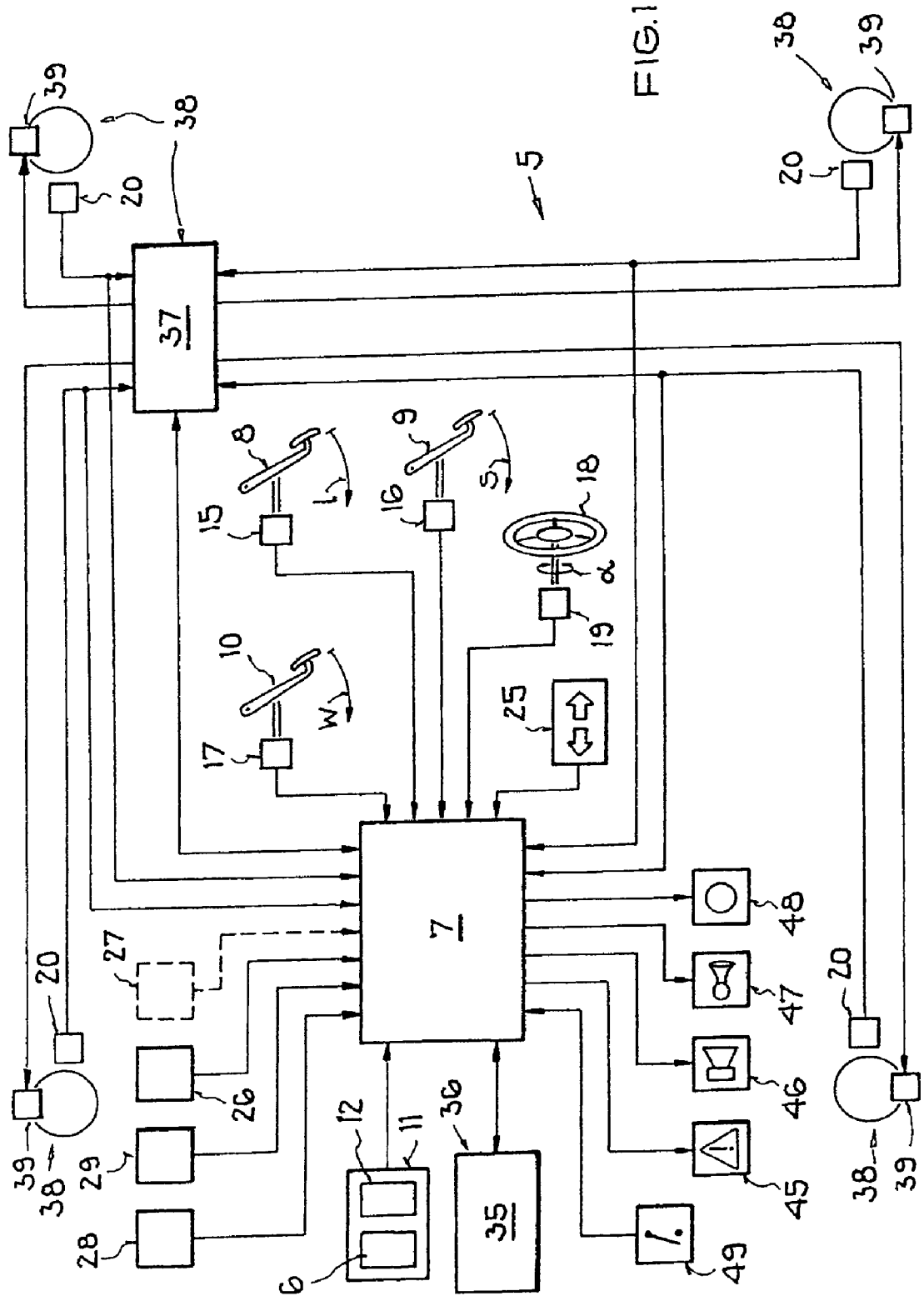
FIG. 1 is a schematic illustration of a representative embodiment of a device for carrying out the method according to the invention.

FIG. 1 shows a device 5 for triggering an automatic emergency braking process of a vehicle. Said device provides an assistance function for avoiding a rear end collision with a vehicle traveling in front, wherein at least the consequences of a rear end collision are reduced if the rear end collision with the vehicle traveling in front cannot be avoided. For this purpose, the device 5 has a sensor unit 11 with a distance sensor 6 for measuring the distance d between the vehicle and vehicle traveling in front, and a relative speed sensor 12 for measuring the relative speed $v_{rel}$ between the vehicle and vehicle traveling in front. The corresponding measurement signals are fed to an evaluation unit 7. In order to obtain a higher measuring accuracy, various physical measuring methods, which are respectively the most suitable, may be used to measure the distance d and the relative speed $v_{rel}$. Radar sensors, for example, are used as the distance sensor 6 and/or relative speed sensor 12.

In a vehicle with a manual change speed gearbox, the device 5 has an accelerator pedal 8, a brake pedal 9 and a clutch pedal 10. The accelerator pedal 8 interacts with an accelerator pedal sensor 15 which registers its deflection 1 and converts it into a corresponding signal. A brake pedal sensor 16 senses the deflection s of the brake pedal and generates a corresponding signal. The signals are fed to the evaluation unit 7. A deflection w of the clutch pedal 10 is sensed by a clutch pedal sensor 17 which is connected to the evaluation unit 7. (In a vehicle with an automatic transmission or automated change speed gearbox there is, of course, no clutch pedal 10 or clutch pedal sensor 17.) Furthermore, there is a steering wheel 18 which interacts with a steering angle sensor 19 which registers the steering wheel angle a set at the steering wheel 18 and converts it into a corresponding signal. The rotational speeds of the vehicle wheels (not illustrated) are sensed by means of wheel speed sensors 20. The signals of the steering angle sensor 19 and of the wheel speed sensors 20 are also fed to the evaluation unit 7.

In addition to activating the direction sensor 25, the evaluation unit 7 takes into account the mass of the vehicle, the coefficient of friction of the brake linings of the wheel brake devices of the vehicle, the visibility conditions and the condition of the roadway. The mass of the vehicle is obtained from the sum of the mass of the unladen vehicle and the mass of the loaded and/or towed mass. The vehicle mass is determined either automatically by means of a mass determining unit 26 connected to the evaluation unit 7 (for example in the manner of a device disclosed in German patent document DE 38 43 818 C1), or alternatively by manual entry by the driver, using a mass input unit 27. The coefficient of friction of the brake lining of the wheel brake devices is taken into account in a known manner (for example, in accordance with the method illustrated in German patent document DE 199 11 902 C1), which is preferably also carried out by the evaluation unit 7. Corresponding sensors 28, 29 are present for determining the surrounding visibility conditions and the condition of the roadway.

After the signals which have been fed to the evaluation unit 7 have been evaluated, the evaluation unit 7, for its part, actuates a drive means controller d 35 of the drive means 36, a brake means controller 37 of the brake means 38 and thus the wheel brake devices 39 of the vehicle, a visual warning device 45, an acoustic warning device 46, the vehicle horn 47 and lighting devices 48 of the vehicle. The drive means 36 of the vehicle are only represented by the drive means controller 35, and for the sake of clarity the drive train, which is associated both with the drive means controller 35 and with the drive means 36, and which comprises the engine, gearbox etc., is not shown. The lighting devices 48 include, for example, the hazard warning lights, the brake lights or the headlights and full beam of the vehicle.

In order to carry out the method according to the invention, the assistance function is activated and deactivated by means of a switch 49 which is connected to the evaluation unit 7. The switch 49 is, for example, part of a user interface of a combination menu unit which is already present in the vehicle.

FIG. 2 shows an embodiment of the method according to the invention in the form of a flowchart. Before more details are given on this, some of the fundamentals will first be explained in more detail for the sake of better understanding.

The following applies to the distance s(t) covered by a vehicle at the time t $$s(t) = s(0) + \int_0^t v(t)dt, \quad (1)$$

where the speed v(t) at the time t is obtained from $$v(t) = v(0) + \int_0^t a(t)dt \quad (2)$$

s(0) is the distance covered by the vehicle at the time t=0, and v(0) is correspondingly the speed and a(0) the acceleration of the vehicle at the time t=0. From this it follows that $$s(t) = s(0) + \int_0^t v(0)dt + \int_0^t \int_0^t a(t)dt\,dt, \quad (3)$$

from which, because v(0) is constant, the following relationship is obtained $$s(t) = s(0) + v(0)dt + \int_0^t \int_0^t a(t)dt\,dt \quad (4)$$

Furthermore it is assumed that the acceleration a(t) of the vehicle has the constant value a(0) at any time t. In this case, the following is obtained $$s(t) = s(0) + v(0)dt + \frac{1}{2}a(0)t^2, \quad (5)$$

and the following from equation (2)

$$v(t) = v(0) + a(0)t. \quad (6)$$

It will now be assumed that a further vehicle is traveling in front of the vehicle, with the vehicle which is traveling in front being subsequently characterized by the index "v". The relative speed $v_{rel}(t)$ between the vehicle and the vehicle traveling in front at the time t is defined by $$v_{rel}(t) = v(t) - v_v(t). \quad (7)$$

The relative speed $v_{rel}(t)$ is therefore positive if the vehicle is approaching the vehicle traveling in front. The following is obtained with equation (6)

$$v_{rel}(t) = v_{rel}(0) + a_{rel}(0)t. \quad (8)$$

Correspondingly, a relative acceleration $a_{rel}(t)$ between the vehicle and vehicle traveling in front at the time t is defined as $$a_{rel}(t) = a(t) - a_v(t). \quad (9)$$

The distance d(t) between the vehicle and vehicle traveling in front at the time t is obtained from $$d(t) = d(0) - s(t) + s_v(t),$$

from which the following relationship is obtained on the basis of equations (5) and (8)

$$d(t) = d(0) - v_{rel}(0)t - \frac{1}{2}a_{rel}(0)t^2 \quad (10)$$

In the following, $t_{tc}$ will be used to designate the time which must pass until the vehicle collides with the vehicle traveling in front ("time-to-crash").

Furthermore it is assumed by way of a simplification that the accelerations of the vehicle and vehicle traveling in front are constant over time. Owing to this simplification, two cases can be distinguished when determining the time $t_{tc}$:

In the first case the vehicle is traveling toward the vehicle traveling in front, which is still moving.

In the second case the vehicle traveling in front comes to a standstill before the vehicle collides with it.

In the second case, owing to the accelerations which are assumed to be constant over time, the vehicle traveling in front would reverse its direction of movement after it has come to a standstill. In reality, this is of course not the case. In this case, unnecessarily early triggering of an automatic emergency braking process would result. In order to avoid this, the first and the second cases must be treated separately, with the acceleration $a_v$ of the vehicle traveling in front starting from its stationary time being zero in the second case.

Generally, a rear end collision with the vehicle traveling in front occurs if the distance d(t) between the vehicle and vehicle traveling in front becomes zero.

In the first case, the time $t_{tc}$ up to the rear end collision with the vehicle traveling in front is therefore determined, because of equation (10), as being $$a_{rel}(0)t_{tc}^2 + 2v_{rel}(0)t_{tc} - 2d(0) = 0. \quad (11)$$

If $a_{rel}(0)=0$ but $v_{rel}(0)\neq 0$, it is also true that $$t_{tc} = \frac{d(0)}{v_{rel}(0)}. \quad (12)$$

As a result:

$$\begin{cases} t_{tc} > 0, & \text{if } v_{rel}(0) > 0 \\ t_{tc} < 0, & \text{if } v_{rel}(0) < 0. \end{cases} \quad (13)$$

The solution of the quadratic equation (11) is $$(t_{tc})_{1,2} = -\frac{v_{rel}(0)}{a_{rel}(0)} \pm \sqrt{\frac{v_{rel}^2(0)}{a_{rel}^2(0)} + \frac{2d(0)}{a_{rel}(0)}}. \quad (14)$$

In the second case, the time $t_{still,v}$ up to the stationary state of the vehicle traveling in front is obtained according to equation (6) for $v_v(0) \geq 0$ by means of $$t_{still,v} = \begin{cases} -\dfrac{v_v(0)}{a_v(0)}, & \text{if } a_v(0) < 0 \\ \infty, & \text{if } a_v(0) \geq 0 \end{cases} \quad (15)$$

For the distance d(t) between the vehicle and vehicle traveling in front at the time $t_{still,v}$ the following thus applies according to equation (10)

$$d(t_{still,v}) = d(0) + v_{rel}(0)\frac{v_v(0)}{a_v(0)} - \frac{1}{2}a_{rel}(0)\left(\frac{v_v(0)}{a_v(0)}\right)^2. \quad (16)$$

For the distance d(t) between the vehicle and vehicle traveling in front the following applies at any desired time $t \geq t_{still,v}$ $$d(t) = d(t_{still,v}) - v(t_{still,v})(t - t_{still,v}) - \frac{1}{2}a(t_{still,v})(t - t_{still,v})^2. \quad (17)$$

According to equation (6) the following is true $$v(t_{still,v}) = v(0) + a(0)t_{still,v} \stackrel{(15)}{=} v(0) - a(0)\frac{v_v(0)}{a_v(0)}. \quad (18)$$

Furthermore, owing to the assumption of constant accelerations which is made, the following is true $$a(t_{still,v}) = a, \quad (19)$$

and thus $$d(t) = d(t_{still,v}) - \left(v(0) - a(0)\frac{v_v(0)}{a_v(0)}\right)(t - t_{still,v}) - \frac{1}{2}a(0)(t - t_{still,v})^2 \quad (20)$$

A rear end collision takes place with the vehicle traveling in front if the distance d(t) between the vehicle and vehicle traveling in front becomes zero. As a result, the time $t_{tc} - t_{still,v}$ between the stationary state of the vehicle traveling in front and the rear end collision of the vehicle with the vehicle traveling in front is therefore determined as $$a(0)(t_{tc} - t_{still,v})^2 + 2\left(v(0) - a(0)\frac{v_v(0)}{a_v(0)}\right)(t_{tc} - t_{still,v}) - 2d(t_{still,v}) = 0. \quad (21)$$

An automatic emergency braking process for avoiding a rear end collision between the vehicle and vehicle traveling in front is to be triggered if the distance d(0), the relative speed $v_{rel}(0)$, the acceleration a(0) of the vehicle and the acceleration $a_v(0)$ of the vehicle traveling in front are in a specific relationship with one another. In order to detect this relationship, in a first step the emergency braking deceleration $a_{NB}$ which is necessary to avoid a rear end collision is determined. The automatic emergency braking process takes place with the objective of attaining a predefined target relative speed $v_{rel,z} = 0$ and a predefined target safety distance $d_z$ between the vehicle and vehicle traveling in front after it has finished. The target safety distance $d_z$ may be equal to zero here, but, for the sake of safety, is generally set to be greater than zero, for example with an order of magnitude of several meters.

In the first case, owing to the simplifying assumption of constant accelerations the vehicle traveling in front maintains its acceleration a even after the automatic emergency braking process has finished. Because of equation (8), the emergency braking time period $t_{NB}$ is given by $$t_{NB} = -\frac{v_{rel}(0)}{a_{rel,NB}}, \quad (22)$$

with the relative emergency braking deceleration $$a_{rel,NB} = a_{NB} - a_v(0) \quad (23)$$

For the distance d(t) which occurs after the automatic emergency braking process has finished is, according to equation (10), $$d(t_{NB}) = d(0) + \frac{1}{2}\frac{v_{rel}^2(0)}{a_{rel,NB}}. \quad (24)$$

Equating with $d_z$ results in the following for the necessary emergency braking deceleration $a_{NB}$ $$a_{NB} = a_v(0) - \frac{v_{rel}^2(0)}{2(d(0) - d_z)}. \quad (25)$$

The invention predefines the emergency braking deceleration $a_{NB}$. In this case, equation (25) can be made easier to understand by reformulation $$2(a_{NB} - a_v(0))(d(0) - d_z) = -v_{rel}^2(0). \quad (26)$$

Therefore, in the first case an automatic emergency braking process is to be triggered if the relationship described in equation (25) or (26) is fulfilled.

In the second case, the vehicle traveling in front still comes to a standstill before the automatic emergency braking process has finished. For the distance d(t) between the vehicle and vehicle traveling in front the following applies on the basis of the equations (12) and (17) for any times where $t > t_{still,v}$ $$d(t) = d(0) + v_{rel}(0)\frac{v_v(0)}{a_v(0)} - \frac{1}{2}a_{rel,NB}\left(\frac{v_v(0)}{a_v(0)}\right)^2 - v(t_{still,v})(t - t_{still,v}) - \frac{1}{2}a_{NB}(t - t_{still,v})^2. \quad (27)$$

The time period after the stationary state of the vehicle traveling in front until the automatic emergency braking process has finished is given, because of equation (18), by $$t - t_{still,v} = -\frac{v(0) - a_{NB}\frac{v_v(0)}{a_v(0)}}{a_{NB}}. \quad (28)$$

With the above and with equation (27) the following is obtained $$d(t) = d(0) + v_{rel}(0)\frac{v_v(0)}{a_v(0)} - \frac{1}{2}a_{rel,NB}\left(\frac{v_v(0)}{a_v(0)}\right)^2 + \frac{\left(v(0) - a_{NB}\frac{v_v(0)}{a_v(0)}\right)^2}{2a_{NB}}. \quad (29)$$

Multiplying out yields the following $$d(t) = d(0) + v_{rel}(0)\frac{v_v(0)}{a_v(0)} + \frac{v^2(0)}{2a_{NB}} - v(0)\frac{v_v(0)}{a_v(0)} + \frac{v_v^2(0)}{2a_v(0)}, \quad (30)$$

and finally by using equation (7) the following is obtained $$d(t) = d(0) - \frac{v_v^2(0)}{2a_v(0)} + \frac{v^2(0)}{2a_{NB}}. \quad (31)$$

The necessary emergency braking deceleration $a_{NB}$ here is therefore $$a_{NB} = \frac{v^2(0)}{\frac{v_v^2(0)}{a_v(0)} - 2(d(0) - d_z)}. \quad (32)$$

If the emergency braking deceleration $a_{NB}$ is predefined, equation (32) can be represented in a more easily understood way by reformulation $$a_{NB}\left(v_v^2(0) - 2a_v(0)(d(0) - d_z)\right) = a_v(0)v^2(0). \quad (33)$$

In the second case, an automatic emergency braking process therefore has to be triggered if the relationship which is described in equation (32) or (33) is fulfilled.

A driver warning is to be triggered a warning time period $t_w$ before the automatic emergency braking process is triggered, said warning time period $t_w$ being permanently predefined in the exemplary embodiment. For the relative speed $v_{rel}(0)$ and the distance $d(0)$ at the time of the triggering of the driver warning the following applies $$v_{rel}(0) = v_{rel,NB} - a_{rel}(0)t_w, \quad (34)$$

$$d(0) = d_{NB} + t_w v_{rel}(0) + \frac{1}{2}t_w^2 a_{rel}(0). \quad (35)$$

Here, $d_{NB}$ and $v_{rel,NB}$ designate respectively the distance and the relative speed between the vehicle and vehicle traveling in front at the time when the automatic emergency braking process is triggered. If the equations (34) and (35) are inserted into equation (26), the following is obtained in the first case $$-2(a_{NB} - a_v(0))\left(d(0) - d_z - t_w v_{rel}(0) - \frac{1}{2}t_w^2 a_{rel}(0)\right) = \quad (36)$$
$$(v_{rel}(0) + a_{rel}(0)t_w)^2,$$

where $d(0)$ and $v_{rel}(0)$ in equation (26) have been replaced by $d_{NB}$ and $v_{rel,NB}$, respectively. This yields the following $$a_{rel}(0)(a_{NB} - a(0))t_w^2 + \quad (37)$$
$$2v_{rel}(0)(a_{NB} - a(0))t_w - 2a_{rel,NB}(d(0) - d_z) - v_{rel}^2(0) = 0.$$

In the first case, the driver warning is triggered when the relationship described in equation (37) is fulfilled.

Furthermore, the following applies for the speeds of the vehicle and vehicle traveling in front $$v(0) = v_{NB} - a(0)t_w, \quad (38)$$

$$v_v(0) = v_{v,NB} - a_v(0)t_w, \quad (39)$$

where $v_{NB}$ and $v_{v,NB}$ are respectively the speed of the vehicle and of the vehicle traveling in front at the time when the automatic emergency braking process is triggered.

If the equations (38) and (39) are inserted into equation (33), the following is obtained in the second case $$a_{NB}(0)(v_v(0) + a_v(0)t_w)^2 - \quad (40)$$
$$2a_{NB}a_v(0)\left(d(0) - t_w v_{rel}(0) - \frac{1}{2}a_{rel}(0)t_w^2 - d_z\right) =$$
$$a_v(0)(v(0) + a(0)t_w)^2,$$

where $d(0)$, $v(0)$ and $v_v(0)$ in equation (33) are replaced by $d_{NB}$, $v_{NB}$ and $v_{v,NB}$, respectively. Equation (40) yields the following $$(a_{NB}(a_v^2(0) + a_v(0)a_{rel}(0)) - a_v(0)a^2(0))t_w^2 + \quad (41)$$
$$2a_v(0)(a_{NB}v_v(0) - a(0)v(0) + a_{NB}v_{rel}(0))t_w +$$
$$a_{NB}v_v^2(0) - a_v(0)v^2(0) - 2a_{NB}a_v(0)(d(0) - d_z) = 0$$

and by using equations (9) and (7) the following is obtained from this $$a_v(0)a(0)\ (a_{NB} - a(0))t_w^2 + 2a_v(0)\ (a_{NB} - a(0))v(0)t_w + \quad (42)$$
$$a_{NB}v_v^2(0) - a_v(0)v^2(0) - 2a_{NB}a_v(0)\ (d(0) - d_z) = 0.$$

The triggering of the driver warning is therefore carried out in the second case if the warning condition which is specified in equation (42) is fulfilled.

The driver warning is intended to be composed of at least two warning stages which are triggered in chronological succession, with each warning stage being assigned a predefined warning stage time period. A warning stage, in which a haptic driver warning is issued, is to be triggered a predefined warning stage time period $t_h$ before triggering of the automatic emergency braking process; and in turn a further warning stage, in which a visual and/or acoustic driver warning is issued, is triggered a predefined warning stage time period $t_{oa}$ before triggering of the haptic driver warning. The warning time period $t_w$ of the driver warning is given in this case by the sum of the predefined warning stage time period $t_{oa}$ of the visual and/or acoustic driver warning and of the predefined warning stage time period $t_h$ of the haptic driver warning. The haptic driver warning is carried out in the form of a partial braking of the vehicle with a predefined partial braking deceleration $a_{TB}$ which is lower than the predefined emergency braking deceleration $a_{NB}$. Accordingly, both the change in speed during the visual and/or acoustic driver warning, on the one hand, and the change in speed during the haptic driver warning must be taken into account separately.

The distance and the relative speed at the time when the driver warning is triggered are described by $$v_{rel}(0) = v_{rel,NB}(0) - a_{rel}(0)t_{oa} - a_{rel,TB}(0)t_h, \quad (44)$$

$$d(0) = d_{NB} + (t_h + t_{oa})v_{rel}(0) + t_h t_{oa} a_{rel}(0) + \frac{1}{2}t_{oa}^2 a_{rel}(0) + \frac{1}{2}t_h^2 a_{rel,h}(0), \quad (45)$$

where $$a_{rel,h}(0) = a_{TB} - a_v(0). \quad (46)$$

Here, $v_{rel,NB}$ is the relative speed and $d_{NB}$ is the distance between the vehicle and vehicle traveling in front at the time when the automatic emergency braking process is triggered. If the equations (44) and (45) are inserted into equation (26), the following is obtained in the first case $$-2(a_{NB} - a_v(0))\left(d(0) - (t_{oa} + t_h)v_{rel}(0) - t_h t_{oa} a_{rel}(0) - \frac{1}{2}t_{oa}^2 a_{rel}(0) - \frac{1}{2}t_h^2 a_{rel,h}(0) - d_z\right) = (v_{rel}(0) + a_{rel}(0)t_{oa} + a_{rel,h}(0)t_h)^2, \quad (47)$$

where $d(0)$ and $v_{rel}(0)$ in equation (26) are replaced by $d_{NB}$ and $v_{rel,NB}$, respectively.

This results in the following $$a_{rel}(0)(a_{NB} - a(0))t_{oa}^2 + \quad (48)$$
$$2((a_{NB} - a(0))v_{rel}(0) + (a_{NB} - a_{TB})a_{rel}(0)t_h)t_{oa} -$$
$$2(a_{NB} - a_v(0))(d(0) - d_z) + 2(a_{NB} - a_v(0))v_{rel}(0)t_h +$$
$$(a_{NB} - a_v(0))a_{rel,h}(0)t_h^2 - (v_{rel}(0) + a_{rel,h}(0)t_h)^2 = 0.$$

The triggering of the driver warning with the two warning stages takes place in the first case when the warning condition which is specified in equation (48) is fulfilled.

Furthermore, the following applies to the speeds of the vehicle and vehicle traveling in front at the time when the driver warning is triggered $$v_v(0) = v_{v,NB} - a_v(0)(t_{oa} + t_h), \quad (49)$$

$$v(0) = v_{NB} - a(0)t_{o,a} - a_{TB}t_h. \quad (50)$$

Inserting the equations (49), (50) and (45) into equation (33) yields, in the second case, $$a_{NB}(v_v(0) + a_v(0)(t_{oa} + t_h))^2 - \quad (51)$$
$$2a_v(0)a_{NB}\left(d(0) - (t_h + t_{oa})v_{rel}(0) - t_h t_{oa} a_{rel}(0) - \frac{1}{2}a_{rel}(0)t_{oa}^2 - \frac{1}{2}a_{rel,h}(0)t_h^2 - d_z\right) = a_v(0)(v(0) + a(0)t_{oa} + a_{TB}t_h)^2,$$

where $d(0)$, $v(0)$ and $v_v(0)$ in equation (33) have been replaced by $d_{NB}$, $v_{NB}$ and $v_{v,NB}$, respectively. This results in the following $$a_{NB}(v_v(0) + a_v(0)t_h) + a_v(0)t_{oa})^2 - \quad (52)$$
$$2a_v(0)a_{NB}\left(d - t_h v_{rel}(0) - t_{oa} v_{rel}(0) - t_h t_{oa} a_{rel}(0) - \frac{1}{2}a_{rel}(0)t_{oa}^2 - \frac{1}{2}a_{rel,h}(0)t_h^2 - d_z\right) = a_v(0)((v(0) + a_{TB}t_h) + a(0)t_{oa})^2$$

and finally $$a_v(0)a(0)(a_{NB} - a(0))t_{oa}^2 + \quad (53)$$
$$(2a_{NB}a_v(0)(v_v(0) + a_v(0)t_h) + 2a_{NB}a_v(0)v_{rel}(0) +$$
$$2a_{NB}a_v(0)a_{rel}(0)t_h - 2a_v(0)a(0)(v(0) + a_{TB}t_h))t_{oa} +$$
$$a_{NB}(v_v(0) + a_v(0)t_h)^2 - 2a_{NB}a_v(0)(d(0) - d_z) +$$
$$2a_{NB}a_v(0)t_h v_{rel}(0) + a_v(0)a_{NB}a_{rel,h}(0)t_h^2 - a_v(0)(v(0) + a_{TB}t_h)^2 = 0.$$

Equation (53) can be further simplified, $$a_v(0)a(0)(a_{NB} - a(0))t_{oa}^2 + \quad (54)$$
$$(2a_{NB}a_v(0)(v(0) + a(0)t_h) - 2a_v(0)a(0)(v(0) + a_{TB}t_h))t_{oa} +$$
$$a_{NB}(v_v(0) + a_v(0)t_h)^2 - 2a_{NB}a_v(0)(d(0) - d_z) +$$
$$2a_{NB}a_v(0)t_h v_{rel}(0) + a_v(0)a_{NB}a_{rel,h}(0)t_h^2 - a_v(0)(v(0) + a_{TB}t_h)^2 = 0.$$

The triggering of the driver warning with the two warning stages therefore takes place in the second case when the warning condition specified in equation (54) is fulfilled.

FIG. 2 illustrates an embodiment of the method according to the invention in the form of a flowchart. The method is started or terminated in a first main step 60 when the driver of the vehicle activates or deactivates the assistance function.

In a second main step 61, the speed $v_v$ of the vehicle traveling in front, the acceleration a of the vehicle, the acceleration $a_v$ of the vehicle traveling in front and the relative acceleration $a_{rel}$ between the vehicle and vehicle traveling in front are determined by the evaluation unit 7 based on the distance d registered by the sensor device 11, and the relative speed $v_{rel}$ between the vehicle traveling in front and the speed v of the vehicle registered by the wheel speed sensors 20. The variables which have previously been counted are generally functions of time t. Furthermore, in the second main step 61 the following are predefined (in a permanent or adjustable fashion: the warning time period $t_w$, a first predefined warning stage time period $t_{oa}$, a second predefined warning stage time period $t_h$, the target safety distance $d_z$, the target relative speed $v_{rel,z}$, the partial braking deceleration $a_{TB}$, the relative partial braking deceleration $a_{rel,h}$ and the emergency braking deceleration $a_{NB}$. Setting is carried out, for example, as a function of the mass of the vehicle, the coefficient of friction of the brake linings of the wheel brake devices, the condition of the roadway or the visibility conditions. The emergency braking time period $t_{NB}$ can be calculated here from the previously specified variables.

In a third main step 62 it is checked whether a first warning stage condition which is given by the equation (48) and (54), respectively, for the triggering of a first warning stage in which the driver warning is issued visually and/or acoustically is fulfilled.

If the first warning stage condition is fulfilled, in a fourth main step 63 the first warning stage of the driver warning is triggered. At the same time, a first time counter $T_1$ is started. In the first warning stage, the driver warning is issued in a visually and/or acoustically perceptible fashion. A visual driver warning is converted, for example, in the form of illuminated signals or hazard symbols or by using the visual warning device 45 to display the remaining time until the automatic emergency braking process is triggered. In contrast, in the case of an acoustic driver warning, for example an alarm signal or a voice warning is issued by means of the acoustic warning device 46, and furthermore according to the example there is provision for radio and telephone to be additionally switched to mute in order to avoid distracting the driver.

On the other hand, if the first warning stage condition is not fulfilled, the method sequence returns again to the second main step 61.

If the presence of an abort criterion, for example the presence of activity on the part of the driver and/or a reduction in the risk of rear end collision, is detected in a fifth main step 64, testing is carried out in a first secondary step 80 to determine whether the first timing counter $T_1$ is lower than the predefined warning time period $t_w$. If this is the case, the method sequence returns to the first secondary step 60 until the first timing counter $T_1$ is at least equal to the predefined warning time period $t_w$. If this is the case, in a subsequent second secondary step 81 the first warning stage of the driver warning is terminated and the method sequence returns again to the second main step 61. As a result, the optical and/or audible driver's warning which take place in the first warning stage are maintained to the end of the warning time period $t_w$ in order to instruct the driver of the potential risk of a rear end collision. Further warning stages and the automatic emergency braking process are not triggered owing to the fulfilled abort criterion.

If, on the other hand, the abort criterion is not fulfilled, a second warning stage of the driver warning is triggered in a sixth main step 66 as soon as it is detected, in a preceding sixth main step 65, that the first timing counter $T_1$ is at least equal to the first predefined warning step time period $t_{oa}$. On the other hand, if the first timing counter $T_1$ is lower than the first predefined warning stage time period $t_{oa}$, the method sequence returns to the fifth main step 64 again.

In the second warning step, the driver warning is issued in a haptically perceptible fashion, specifically in the form of a partial braking process of the vehicle with the predefined partial braking deceleration $a_{TB}$. When the second warning stage is triggered, a second timing counter $T_2$ is simultaneously started.

In this exemplary embodiment it is assumed that driver warning is composed of a total of two warning stages. It is also conceivable to have any other number of warning stages with the driver warning being issued in each case in a visually and/or acoustically and/or haptically perceptible fashion.

If, in an eighth main step 67, it is detected that the abort criterion, according to example activity on the part of the driver and/or reduction in the risk of a rear end collision, is fulfilled, the first warning stage and the second warning stage of the driver warning are terminated in a third secondary step 82 and the method sequence returns again to the second main step 61. It is also conceivable here to maintain the first warning stage until the end of the warning time period $t_w$ in order to instruct the driver of a potential risk of a rear end collision.

However, if the abort criterion is not fulfilled in the eighth main step 67, the first and second warning stages of the driver warning are terminated in a tenth main step 69 and the automatic emergency braking process is triggered by a corresponding actuation of the braking means 36 and the drive means 38 as soon as it is detected, in a preceding ninth main step 69, that the second timing counter $T_2$ is at least equal to the second predefined warning stage time period $t_h$. At the same time, a warning of vehicles traveling in front and/or vehicles traveling behind is issued by activating the light devices 48 of the vehicle which include, for example, the hazard warning lights, the brake lights or the headlights or full beam or by activating the horn 47 of the vehicle. When the automatic emergency braking process is triggered, an emergency braking time counter $T_{NB}$ is also started.

In an eleventh main step 70 it is checked whether the emergency braking time counter $T_{NB}$ is lower than the registered emergency braking time period $t_{NB}$. As long as this is not the case, the method sequence returns to the eleventh main step 70. An automatic emergency braking process which has already been triggered can therefore not be aborted early. As soon as the emergency braking time counter $T_{NB}$ is at least equal to the registered emergency braking time period $t_{NB}$, both the first warning stage of the driver warning and the automatic emergency braking process are terminated in a fourth secondary step 83, with the method sequence subsequently returning to the second main step 61 again.

The abort criterion which is checked in the fifth main step 64 and in the sixth main step 67 is fulfilled if as a result of driver activity it is possible to conclude that the driver is attentive, or if no emergency situation exists any more as a result of a reduction in the risk of a rear end collision. Activity on the part of the driver is detected on the basis of an activation of at least one of the operator control elements of the vehicle, with the operator control element being used in particular to change the longitudinal dynamics or transverse dynamics of the vehicle. For example the accelerator pedal 8, brake pedal 9, clutch pedal 10 or steering wheel 11 are associated with a change in the longitudinal dynamics or transverse dynamics. However, it is also possible to conclude that the driver is attentive as a result of an activation of the direction indicator 25. In the case of the accelerator pedal 8, brake pedal 9, clutch pedal 10 or steering wheel 18 it is expedient to conclude that a driver activity is occurring only when the change in the deflection I of the accelerator pedal, the deflection s of the brake pedal, the deflection w of the clutch pedal or the steering wheel angle α respectively exceed a specific, predetermined threshold value.

A reduction in the risk of a rear end collision may be inferred, for example, from an increasing distance d between the vehicle and vehicle traveling in front, and/or a decreasing absolute value of the relative speed $v_{rel}$ between the vehicle and vehicle traveling in front. Here, too, the abort criterion is fulfilled, for example, only if the increase in the distance d between the vehicle and vehicle traveling in front and/or the decrease in the relative speed $v_{rel}$ between the vehicle and vehicle traveling in front lie above predefined threshold values.

Figure 2A:
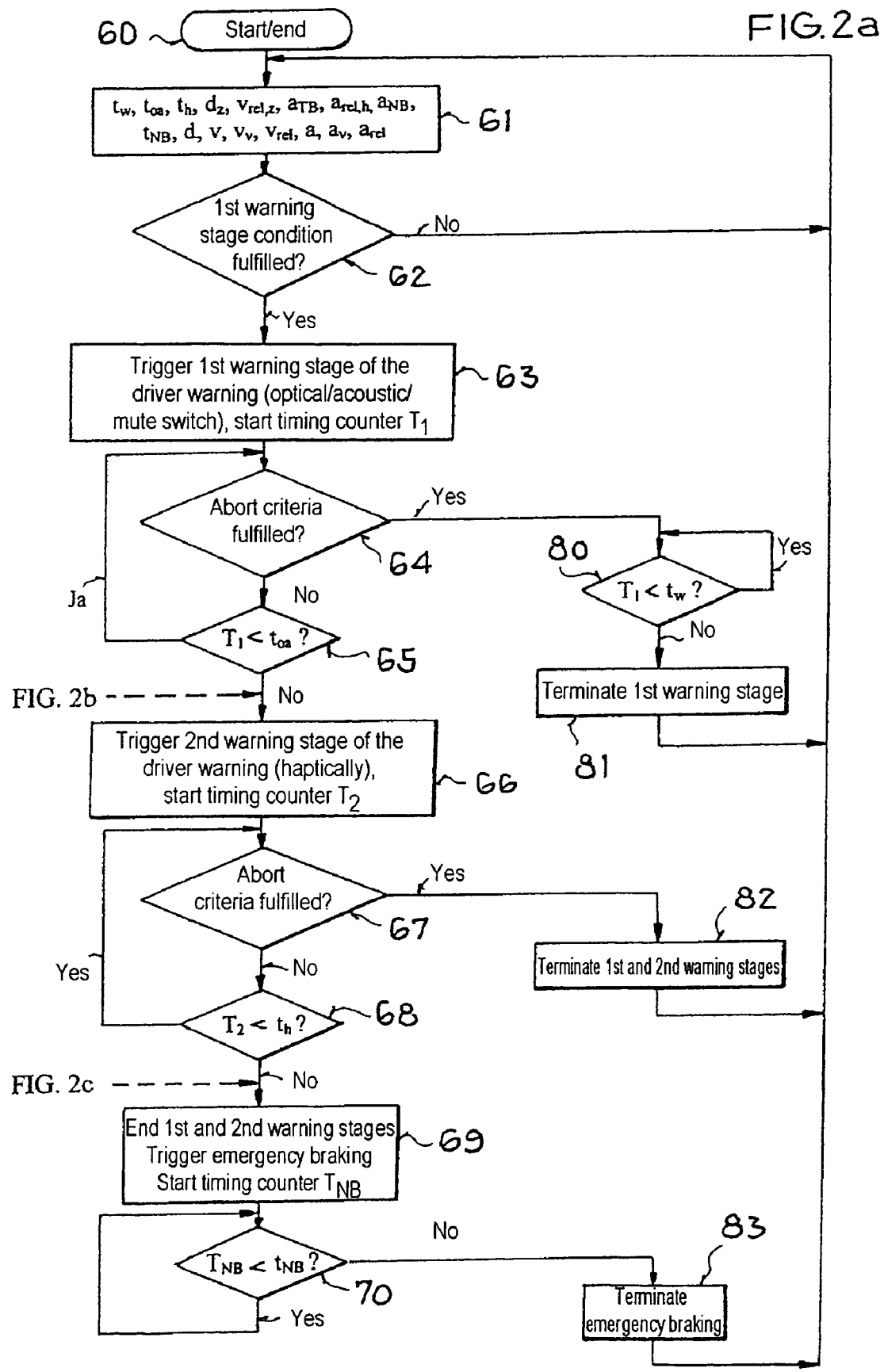
FIG. 2a is an embodiment of the method according to the invention in the form of a flowchart.

FIG. 2b shows an alternative exemplary embodiment of the method according to the invention in the form of a supplement to the flowchart represented in FIG. 2a. The second warning stage of the driver warning is triggered here only if it is detected, in a first supplementary step 65', that an associated, given second warning stage condition according to equation (37) or (42) is fulfilled. If this is not the case, in a fifth secondary step 84 it is checked whether the first timing counter $T_1$ is lower than the predefined warning time period $t_w$. If this is the case, the method sequence returns to the fifth secondary step 84 until the first timing counter $T_1$ is at least equal to the predefined warning time period $t_w$. If this is the case, in a subsequent seventh secondary step 88 the first warning step of the driver warning is terminated and the method sequence returns again to the second main step 61. Here, too, the visual and/or acoustic driver warning which is issued in the first warning stage is maintained up to the end of the warning time period $t_w$ in order to instruct the driver of a potential risk of a rear end collision.

FIG. 2c shows a further alternative exemplary embodiment of the method according to the invention in the form of a further supplement to the flowchart illustrated in FIG. 2a. The automatic emergency braking process is triggered only if it is detected, in a second supplementary step 68', whether an associated, given emergency braking condition according to equation (37) or (42) is fulfilled. If this is not the case, in a seventh secondary step 86 the second warning stage of the driver warning is terminated and the method sequence returns again to the second main step 61.

It is conceivable in this context to combine the exemplary embodiments shown in FIGS. 2b and 2c with one another.

Finally, FIG. 3 shows an exemplary illustration of the time sequence of the method according to the invention, with the assumption that no abort criterion is fulfilled and the automatic emergency braking process is triggered. When the first warning stage is triggered, the driver warning is issued in a visually and/or acoustically perceptible fashion, and at the same time the first timing counter $T_1$ is started. If the first timing counter $T_1$ reaches the first predefined warning stage time period $t_{oa}$, the second warning stage is triggered, said warning stage being issued in a haptically perceptible fashion in the form of a partial braking process. At the same time, the second timing counter $T_2$ is started. The first warning stage of the driver warning continues to be maintained, while it is also conceivable to terminate said warning stage with triggering of the second warning stage. If the second timing counter reaches the second predefined warning stage time period $t_h$, the second warning stage and, if appropriate, also the first warning stage of the driver warning are terminated and the automatic emergency braking process is triggered. At the same time, the emergency braking time counter $T_{NB}$ is triggered. If the emergency braking time counter $T_{NB}$ reaches the detected emergency braking time period $T_{NB}$, the first warning stage of the driver warning and the automatic emergency braking process are terminated.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A method for triggering automatic emergency braking in a first vehicle to avoid or mitigate the effect of a rear end collision with a second vehicle traveling ahead of the first vehicle, by implementing a predefined emergency braking deceleration, said method comprising:

determining an instantaneous driving situation of the first vehicle, based on a registered acceleration of the first vehicle;

determining whether a predefined warning condition is fulfilled based on said instantaneous driving situation of said first vehicle, and on said predefined emergency braking deceleration;

triggering a driver warning if said predefined warning condition is fulfilled; and triggering an automatic emergency braking process, which causes said first vehicle to decelerate with the predefined emergency braking deceleration, after the driver warning has been triggered; wherein, the warning condition includes, as target conditions, a predefined target safety distance and a predefined target relative speed between the first and second vehicles, which are to be attained after said automatic emergency braking process is completed;

in determining the instantaneous driving situation of the first vehicle, in addition to the registered acceleration of the first vehicle, a registered current relative acceleration between the first and second vehicles is also taken into account; and triggering of said automatic emergency braking process is delayed until expiration of a predefined warning time period after the driver warning has been triggered.

2. The method as claimed in claim 1, wherein the driver warning includes at least one of visual, acoustic, and haptic signals.

3. The method as claimed in claim 2, wherein:

said driver warning can be perceived haptically by the driver of the vehicle, and comprises a partial braking process of the vehicle with a predefined partial braking deceleration; and the predefined partial braking deceleration is smaller than the predefined emergency braking deceleration.

4. The method as claimed in claim 1, wherein the automatic emergency braking process is triggered only if a given emergency braking condition is fulfilled and the predefined warning time period has expired.

5. The method as claimed in claim 1, wherein the emergency braking deceleration is predefined in a permanent or adjustable fashion.

6. The method as claimed in claim 1, wherein the warning time period is predefined in a permanent or adjustable fashion.

7. The method as claimed in claim 1, wherein the target relative speed is predefined in a permanent or adjustable fashion.

8. The method as claimed in claim 7, wherein the permanently predefined target relative speed between the vehicle and vehicle traveling in front has a value of approximately zero.

9. The method as claimed in claim 1, wherein the target safety distance is predefined in a permanent or adjustable fashion.

10. The method as claimed in claim 1, wherein, when it is determined that the driver is attentive, or that the risk of a rear end collision is reduced, the driver warning is not triggered.

11. The method as claimed in claim 1, wherein, when the driver is attentive or the risk of a rear end collision is reduced, a driver warning which has already been triggered is terminated or changed, or the automatic emergency braking process is not triggered.

12. The method as claimed in claim 1, wherein the automatic emergency braking process is triggered automatically when the predefined warning time period expires if the driver warning is not aborted during the predefined warning time period.

13. The method as claimed in claim 1, wherein an automatic emergency braking process which has already been triggered is aborted if a detected emergency braking time period or the predefined target relative speed and the predefined target safety distance are attained.

14. The method as claimed in claim 1, wherein:
the driver warning comprises at least two warning stages which are triggered in chronological succession within the predefined warning time period of the driver warning; and
each warning stage is assigned a predefined warning stage time period.

15. The method as claimed in claim 14, wherein the warning stage time period is predefined in a permanent or adjustable fashion.

16. The method as claimed in claim 15, wherein, when the driver is attentive or when the risk of a rear end collision is reduced, at least one of the warning stages which has already been triggered is terminated or further warning stages are prevented.

17. The method as claimed in claim 16, wherein attentiveness of the driver is detected on the basis of an activation of at least one operator control element which controls longitudinal or lateral dynamics of the vehicle.

18. The method as claimed in claim 16, wherein a reduction in the risk of a rear end collision is detected by reference to at least one of an increasing distance between the first and second vehicles and a decreasing relative speed between the first and second vehicles.

19. The method as claimed in claim 1, wherein the instantaneous driving situation of the first vehicle is determined as a function of at least one of the detected distance between the first and second vehicle, the detected relative speed between the first and second vehicles, detected speed of the first vehicle, detected relative acceleration between the first and second vehicles, detected acceleration of the first vehicle, inclination of a roadway on which the first vehicle travels, and coefficients of friction between the roadway and wheels of the vehicle.

20. The method as claimed in claim 1, wherein, when automatic emergency braking is triggered, a warning is issued to vehicles traveling in front or behind.

21. A method for triggering automatic emergency braking in a first vehicle to avoid or mitigate the effect of a rear end collision with a second vehicle traveling ahead of the first vehicle, by implementing a predefined emergency braking deceleration, said method comprising:
determining an instantaneous driving situation of the first vehicle, based on a registered acceleration of the first vehicle;
determining whether a predefined warning condition is fulfilled based on said instantaneous driving situation of said first vehicle, and on said predefined emergency braking deceleration;
triggering a driver warning if said predefined warning condition is fulfilled; and
triggering an automatic emergency braking process, which causes said first vehicle to decelerate with the predefined emergency braking deceleration, after the driver warning has been triggered; wherein,
the warning condition includes, as target conditions, a predefined target safety distance and a predefined target relative speed between the first and second vehicles, which are to be attained after said automatic emergency braking process is completed;
in determining the instantaneous driving situation of the first vehicle, in addition to the registered acceleration of the first vehicle, a registered current relative acceleration between the first and second vehicles is also taken into account;
triggering of said automatic emergency braking process is delayed until expiration of a predefined warning time period after the driver warning has been triggered;
the driver warning comprises at least two warning stages which are triggered in chronological succession within the predefined warning time period of the driver warning;
each warning stage is assigned a predefined warning stage time period;
the warning stage time period is predefined in a permanent or adjustable fashion; and
after a first warning stage has been triggered, at least one further warning stage is triggered only if a predefined warning stage condition assigned to the further warning stage is fulfilled.

22. Apparatus for carrying out automatic emergency braking in a first vehicle to avoid, or mitigate the effects of, a rear end collision with a second vehicle traveling ahead of the first vehicle by implementing a predefined emergency braking deceleration, said apparatus comprising an evaluation unit which triggers a driver warning when at least one predefined warning condition stored in the evaluation unit is fulfilled; wherein:
an instantaneous driving situation of the first vehicle is determined based on a registered acceleration of the first vehicle;
fulfillment of the warning condition requires that, based on the instantaneous driving situation of the first vehicle, and on said predefined emergency braking deceleration, an automatic emergency braking process which causes the vehicle to decelerate with the predefined emergency braking deceleration, is to be triggered by suitable actuation of braking means of the vehicle;
the warning condition includes, as target conditions, a predefined target safety distance and a predefined target relative speed between the first and second vehicles, which are to be attained when said automatic emergency braking process is completed;
in determining the instantaneous driving situation of the first vehicle, in addition to the registered acceleration of the first vehicle, a registered current relative acceleration between the first and second vehicles is taken into account;
said automatic emergency braking process is triggered only after the driver warning has been triggered and a predefined warning time period has expired thereafter.

* * * * *